United States Patent [11] 3,603,253

| [72] | Inventors | Kenneth J. Tonkin<br>Glenview;<br>John P. Gallagher, Park Ridge, both of, Ill. |
|---|---|---|
| [21] | Appl. No. | 29,690 |
| [22] | Filed | Apr. 17, 1970 |
| [45] | Patented | Sept. 7, 1971 |
| [73] | Assignee | A. B. Dick Company<br>Niles, Ill.<br>Continuation of application Ser. No. 633,866, Apr. 26, 1967, now abandoned. |

[54] DUPLICATOR PROGRAM CONTROL ASSEMBLY
9 Claims, 4 Drawing Figs.

[52] U.S. Cl. .................................................. 101/142, 101/132.5
[51] Int. Cl. .................................................. B41f 7/02
[50] Field of Search ................................... 101/132.5, 142, 132

[56] References Cited
UNITED STATES PATENTS

| 2,759,416 | 8/1956 | George et al. | 101/217 |
| 2,908,220 | 10/1959 | Eichenbaum et al. | 101/322 X |
| 2,916,988 | 12/1959 | Cragg | 101/144 |
| 3,034,427 | 5/1962 | Ostwald | 101/144 |
| 3,056,346 | 10/1962 | Gammeter et al. | 101/218 X |
| 3,102,470 | 9/1963 | Cragg et al. | 101/144 |
| 3,343,484 | 9/1967 | Dahlgren | 101/148 |
| 3,412,676 | 11/1968 | Tonkin et al. | 101/144 |
| 3,426,678 | 2/1969 | Carper et al. | 101/132.5 |
| 3,431,841 | 3/1969 | Tonkin et al. | 101/142 |

Primary Examiner—Edgar S. Burr
Attorney—Peter S. Lucyshyn

ABSTRACT: The duplicator program control assembly includes a preparation counter responsive to cycles of machine rotation to program the machine through a preduplicating phase of operation and then trigger a postpreparation counter which responds to a sheet count during a duplicating phase of operation and a cycle count during a post duplicating phase to program the machine through these subsequent phases. The program control assembly also includes a master forwarding unit and a sensing unit operable at the termination of each operational cycle of the machine to sense the presence or absence of a new master sheet in the forwarding unit; the program control assembly operating to automatically initiate a new operating cycle if a master is sensed.

PATENTED SEP 7 1971

INVENTORS
KENNETH J. TONKIN
JOHN P. GALLAGHER

BY Bartholomew Diggins

ATTORNEY

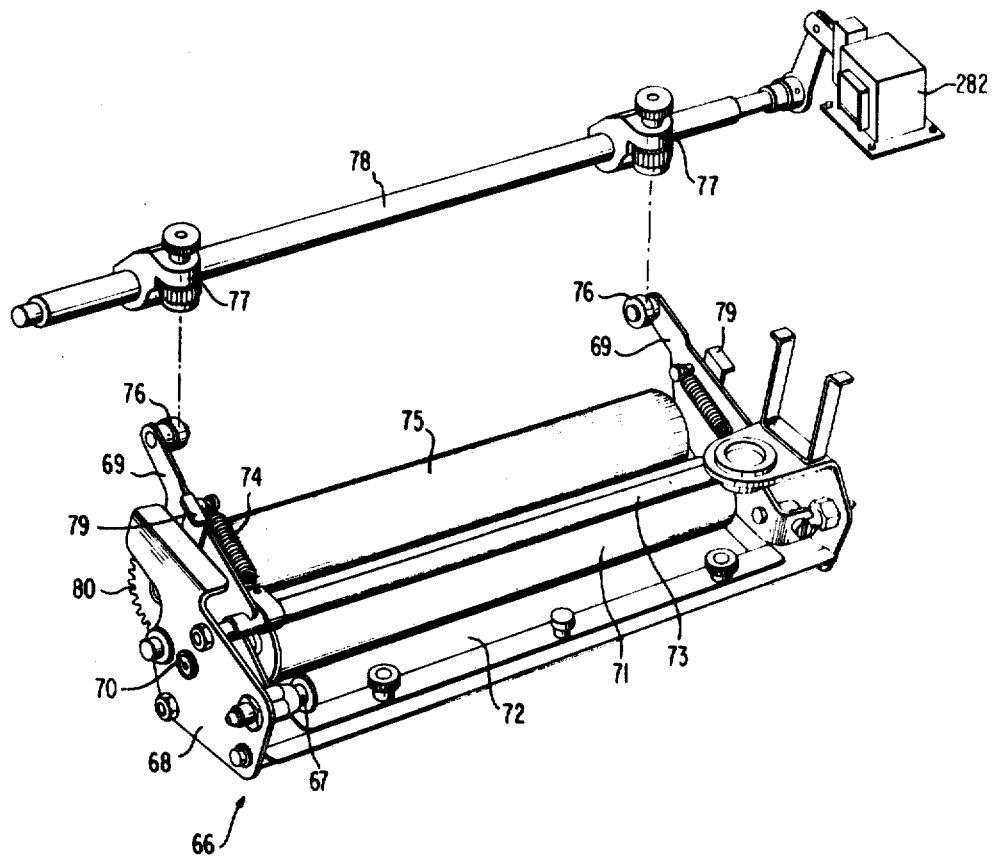

DUPLICATOR PROGRAM CONTROL ASSEMBLY

This application is a continuation of our earlier filed U.S. Pat. application, Ser. No. 633,866, filed Apr. 26, 1967, now abandoned, and entitled "DUPLICATOR PROGRAM CONTROL ASSEMBLY."

The present invention relates to duplicating machines generally, and more particularly to a novel and improved program control unit for an automated duplicating machine.

Recent trends toward the automation of duplicating equipment have led to the development of improved duplicator control systems for electrically and mechanically controlling the sequence of machine operation during a plurality of individual processing steps. The majority of control systems thus far developed, however, have been designed to achieve the maximum automatic control possible during only a single duplicating cycle of machine operation.

It is a primary object of this invention to provide a novel and improved program control unit for a duplicating machine.

Another object of this invention is to provide a novel and improved program control unit for a duplicating machine which is adapted to automatically control the machine through a continuous sequence of complete duplicating cycles.

A further object of this invention is to provide a novel and improved program control unit for a duplicating machine which operates automatically to sense the presence of a master printing sheet in position for a subsequent duplicating cycle to determine whether a new cycle is to be automatically initiated thereby.

Another object of this invention is to provide a novel and improved program control unit for a duplicating machine which includes a preparation sequencing assembly for controlling the preduplicating phase of machine operation and a postpreparation sequencing assembly operative upon actuation by the preparation sequencing assembly to control the duplicating and postduplicating phases of machine operation.

A further object of this invention is to provide a novel and improved program control unit for offset duplicating machines which controls the preduplicating phase of machine operation in response to cylinder rotation, the duplicating phase of machine operation in response to the number of copy sheets fed through the machine, and the postduplicating phase of machine operation in response to cylinder rotation.

Another object of this invention is to provide a novel and improved program control unit for a duplicating machine which is adapted to operate normally to control the duplicating machine for a programmed preduplicating and postduplicating phase of machine operation while being adapted to receive and operate under the control of a removable, high-capacity auxiliary counter assembly during the duplicating phase of machine operation.

A further object of this invention is to provide a novel and improved program control unit for a duplicating machine which includes a master printing sheet control section for effectively controlling the feeding and loading of master printing sheets from a supply stack.

Another object of this invention is to provide a novel and improved program control unit for a duplicating machine which automatically terminates machine operation at the completion of a duplicating operational cycle if a new master printing sheet is not in position for loading on the machine main cylinder.

A further object of this invention is to provide a novel and improved program control unit for a duplicating machine capable of programming the machine through an adjustable, preset rundown cycle at the end of a duplicating phase of machine operation.

Another object of this invention is to provide a novel and improved program control unit for a duplicating machine which includes a preparation control assembly operable in response to cylinder rotation to program mechanical linkages and electrical operating circuitry for machine components which operate during the preduplicating phase of machine operation to prepare the machine for a subsequent duplicating phase of operation.

A further object of this invention is to provide a novel and improved automatic etcher unit for a duplicating machine and a programming unit therefor.

A still further object of this invention is to provide a novel and improved program control unit for a duplicating machine which is adapted to operate effectively with a variety of machine operational modes.

The foregoing and other objects of the invention will become apparent upon a consideration of the following specification and appended claims taken in conjunction with the accompanying drawings in which:

FIG. 3 is a fragmentary perspective view of the automatic etcher unit for the program control unit of the present invention.

GENERAL DUPLICATOR STRUCTURE

Figure 1:
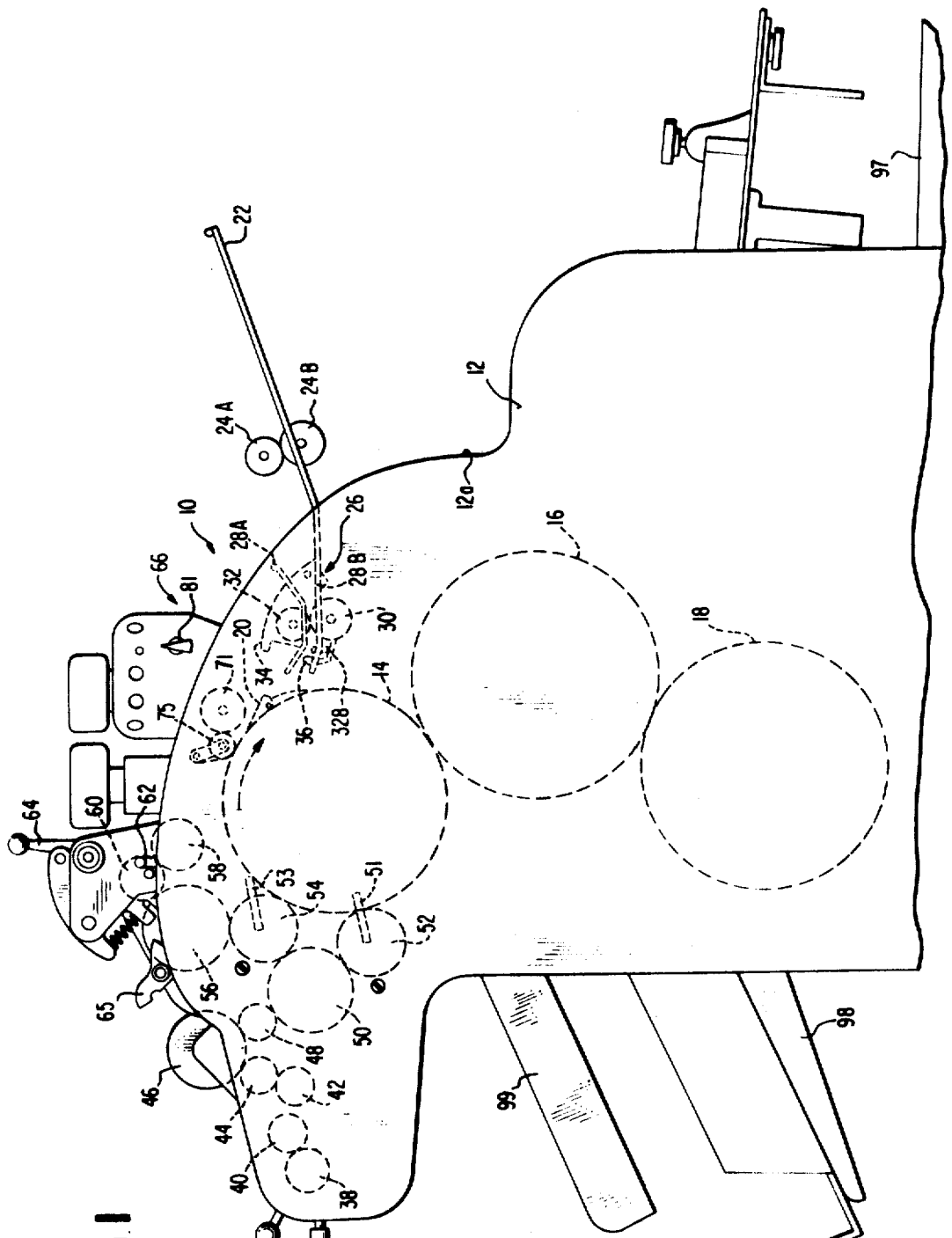
FIG. 1 is a view in side elevation of a duplicating machine incorporating the program control unit of the present invention.

Referring now to FIG. 1, an automated offset lithographic duplicating machine incorporating the novel programming unit of the present invention is indicated generally at 10. This machine includes a number of components which are conventional to well-known duplicating machines of this type. The framework of the duplicating machine 10 is formed primarily by a sideplate 12 which is maintained in spaced relationship with a similar sideplate 12a (not shown). The sideplates 12 and 12a support the various instrumentalities of the duplicating machine 10.

As illustrated by FIG. 1, a master cylinder 14, an offset or blanket cylinder 16, and an impression cylinder 18 are mounted for rotation between the sideplates 12 and 12a. The master cylinder 14 is adapted to hold a lithographic master, and for this purpose, is provided with a solenoid-operated clamping mechanism 20. This clamping mechanism can be formed by any suitable master-gripping unit, many of which are known to the prior art, and is actuated by a control solenoid activated in a manner to be subsequently described.

The blanket cylinder 16 is mounted for rotational and reciprocatory movement between the plates 12 and 12a and is adapted to be selectively engaged by the master cylinder 14. When the master cylinder is moved into engagement with the blanket cylinder, the blanket cylinder receives a reversed inked image from the lithographic sheet or plate mounted upon the master cylinder.

A stack of lithographic master sheets is initially positioned upon a storage support tray 22, and individual masters are then selectively removed by motor-driven upper and lower feed rollers 24*a* and 24*b*, and driven thereby to a master-forwarding assembly 26. The master-forwarding assembly includes an upper sheet guide 28*a* with a lower sheet guide 28*b* spaced therefrom. The lower sheet guide is provided with slots to permit a lower motor-driven feed roller 30 to project above the support surface thereof while the upper guide is similarly constructed to permit an upper feed roller 32 to be lowered into feeding contact with the lower feed roller. Upper feed roller 32 is mounted upon a pivoted mount 34 which permits the upper feed roller to be pivoted into and away from feeding contact with the lower feed roller. Also connected for movement with the pivoted mount is a sheet stop 36 which projects above the lower guide 28*b* when the upper feed roller 32 is raised away from feeding contact with the lower feed roller. However, when the mount 34 is dropped by a master feed solenoid (not shown) operatively connected thereto, the sheet stop 36 is also dropped to permit a master to be fed into the master cylinder clamp 20 by the feed rollers 30 and 32.

Before the duplicating machine 10 begins a duplicating phase of operation, the machine must be subjected to a preparatory preduplicating phase, during which etch solution is applied to the master cylinder 14 by an etching system to be subsequently described in greater detail, and then ink and ink-repellent solution are supplied to the master cylinder by means of an ink and water system. Although any suitable ink and water system may be employed, it is preferable to employ an automated system which is similar in general construction and operation to the nonautomated repellent system for lithographic duplicators illustrated by U.S. Pat. No. 2,929,316 to W. R. Fowlie, issued Mar. 22, 1960.

The ink system includes an ink fountain roller 38 which transfers ink from an ink fountain (not shown) to the surface of an ink ductor roller 40. This ink ductor roller transfers ink intermittently to a distributor roller 42 which, in turn, transfers ink to a second distributor roller 44. Ink from the second distributor roller is then transferred to the surface of an oscillating ink roller 46, and roller 46 operates to evenly spread ink onto a distributor roller 48 which contacts an oscillating roller 50. The oscillating roller 50 contacts a lower ink form roller 52 and an upper ink form roller 54, both of which operate to spread ink onto the lithographic master carried by the master cylinder 14. The form rollers 52 and 54 are automated solenoid-operated form rollers of the type employed in the A. B. Dick Offset Duplicator Model 367A.

It should be noted that the upper ink form roller 54 also contacts an oscillating distributor roller 56 which oscillates to aid in the even distribution of ink upon the master. Additionally, the ink form roller 54 and the oscillating distributor roller 56 form part of the system which supplies water or other dampening solution to the master cylinder 14. This solution is provided to the oscillating distributor roller 56 from a fountain (not shown) by means of a fountain roller 58 and a ductor roller 60. Ductor roller 60 may be moved into or out of contact with the oscillating distributor roller 56 by means of an operating variable control knob 62, and may be completely disengaged from contact with both the fountain roller 58 and the oscillating distributor roller by movement of an operating handle 64. The ductor roller is mounted between the sidewalls 12 and 12a on a pivoted mount which is positioned by a lockout assembly. The ductor lockout assembly may be operated manually to a handle 65 which is secured thereto or automatically by a solenoid actuator connected to move the lockout assembly and cause the ductor roller to pivot into contact with the oscillator roller.

Before the ink and water system is brought into operation, the nonprinting surfaces of the lithographic master on the master cylinder 14 must be coated with an ink-repellent solution by means of an etch applicator. For this purpose, the duplicating machine 10 employs an automated etcher assembly 68 (FIGS. 1 and 3) which is removably mounted between the sideplates 12 and 12a of the duplicating machine 10. The etcher assembly is supported between the sideplates of the duplicating machine by means of suitable track guides, not shown, which engage roller supports 70 mounted upon a main frame 72 of the etcher assembly. This mounting construction permits the etcher assembly to be removed as a unit from the duplicating machine 10.

The etcher assembly primarily consists of the main frame 72 and substantially parallel support arms 74 which are pivotally mounted at either side of the main frame. The pivoted support arms move relative to the main frame about a shaft 76 for a metering roller 78. The shaft 76 mounts the metering roller on the main frame 72 so that the metering roller is in position to supply fluid from a fountain or reservoir 80 which is removably supported upon the main frame.

Extending between the support arms 74 and an adjust bar 82 which is secured to the main frame are two return springs 84 which operate to bias the support arms in a counterclockwise direction about the shaft 76. These return springs urge an etch applicator roller 86, which is rotatably mounted between the support arms 74, into contact with the metering roller 78. The return springs also operate to urge the free ends 88 of the support arms toward adjustable contact members 90 which are secured to an etch applicator operator bar 92. This operator bar is positioned above the ends of the support arms 74 so that the adjustable contact members 90 are permitted to move into contact with the support arms when the operator bar is rotated. One end of the operator bar is supported for rotation on the sideplate 12 of the duplicator 10, while the opposite end of the operator bar is connected to be driven by an etch solenoid 282, to be subsequently described.

The etch applicator roller 86 is locked in place on the support arms 74 by latch members 94. By manipulating these latch members, the etch applicator roller may be removed from the support arms to facilitate replacement of the fabric cover thereof.

The metering roller 78 is directly driven by a suitable motor unit, and also, the etch applicator roller 86 is positively driven by a suitable gearing arrangement connected between an etch applicator roller drive gear 95 secured thereto, and the shaft of the metering roller 78. This positive drive of the etch applicator roller is important to the effective operation of the etcher assembly 68, for, as indicated by the arrows in FIG. 1, the etch applicator roller is driven in a direction which is opposed to the direction of rotation of the master cylinder 14.

In operation, the etcher assembly 68 provides a number of definite advantages which may not be achieved with a conventional etcher system. For example, it has been noted that in known systems employing a stationary etch applicator, the applicator when first contacting the master cylinder initially provides a great volume of etch fluid to the master cylinder surface. However, as the master cylinder turns, the fluid from the single etch applicator contact surface is exhausted, and an uneven application occurs. With such stationary applicators, it is impossible to accurately control the application of etching solution to the master cylinder by varying the pressure between the applicator and the master cylinder to acquire an even, uniform application of etch solution.

The etcher assembly 68 combines the advantages of adjustable pressure, adjustable speed, and the reverse rotation of the etch applicator roller with respect to the master cylinder to achieve a very accurate control of the volume of etch fluid applied to the master cylinder. The friction present at the contact point between the etch applicator roller and the master cylinder aids in squeezing an even film of fluid from the absorbent applicator surface.

To initiate an etching operation, the etch solenoid 282 rotates the operator bar 92 so that the adjustable contact members 90 force the free ends of the support arms 74 downwardly about the pivot point formed by the shaft 76 against the bias of the return springs 84 to bring the etch applicator roller 86 into contact with the master cylinder 14. The metering roller 78 provides etch fluid from the reservoir 80 to the absorbent surface of the etch applicator roller and the applicator roller in turn provides an even fluid coating to the surface of the master cylinder. The metering roller is directly driven and in turn, drives the etch applicator roller by a gearing arrangement including the gear 95.

To control the etch fluid coating on the master cylinder, the pressure and speed of the etch applicator roller 86 may be varied. This may be accomplished by adjusting the adjustment screws on the contact members 90 to vary the pressure between the etch applicator roller and the master cylinder. Also, the adjust bar 82 may be rotated to vary the bias force exerted by the return springs 84, which in turn adjusts the relative pressure between the etch applicator roller and the metering roller.

The reverse rotation of the etch applicator roller with respect to the master cylinder not only provides a scrubbing effect to the master cylinder but also ensures even etching of the master cylinder. This reverse rotation of the etch applicator roller against the master cylinder continuously presents a new, replenished applicator roller surface to the master cylinder so that a continuous supply of etch fluid is provided.

The amount of fluid provided is controlled by both the pressure adjust units for the assembly 68 and the speed of the etch applicator roller. The greater the speed of the applicator roller in the reverse direction, the greater will be the application of etch fluid to the master cylinder. Speed control is accomplished by controlling the speed of a drive motor for the metering roller 78 by means of a suitable voltage-regulating device positioned in the power circuit for the roller drive motor as will be subsequently described in greater detail. A control knob 96 is employed to vary the setting of the voltage-regulating device.

It will be apparent that the directly driven reversely rotating etch applicator roller of the etcher assembly 68 is capable of controlling the application of etch fluid with an accuracy not to be achieved with either a stationary etch applicator or a nondriven, freely rotating applicator. Like the stationary applicator, the freely rolling applicator must rely solely upon relative pressure control between the applicator, the master cylinder, and the metering roller to provide even a semblance of etch fluid control. No speed control can be achieved, and since the freely rotating applicator rotates in the same direction as does the master cylinder, no scrubbing action of the master cylinder is accomplished for no frictional contact between the applicator and the master cylinder is developed to ensure an even transfer of fluid from the etch applicator surface. However, with the reversely rotating, positively driven applicator of the etcher assembly 68, the friction present between the applicator and the master cylinder ensures that an accurate supply of etch fluid will be discharged from the applicator surface in a volume which is dependent upon the pressure and the speed of the applicator. This volume may be accurately controlled to such an extent by both speed and pressure variation that it is possible, for short runs of the duplicating machine 10, to sufficiently etch the surface of the master on the master cylinder to such an extent that subsequent use of a dampening system is not required.

With the completion of the preduplicating phase, copy sheets are adapted to be fed into the duplicating machine 10 from a sheet-holding tray 97 by means of a suitable sheet-feeding device (not shown). For example, the combination sheet-feeding device and paper feed table illustrated by U.S. Pat. No. 2,942,877 to W. R. Fowlie et al., issued June 28, 1960, may be effectively employed with the duplicator 10.

The sheet-feeding device is actuated by means of a mechanical linkage and operates to remove single copy sheets from the sheet-holding tray 97 and subsequently feed such sheets between the blanket cylinder 16 and the impression cylinder 18 so that the inked image from the blanket cylinder is transferred to the copy sheets. The copy sheets, after receiving an imprinted, inked image, are then discharged into a receiving tray 98 which may constitute a motor-driven, two-position tray adapted to change position at the end of each complete duplicating cycle.

Upon completion of the duplicating phase of machine operation, a solenoid-operated master-ejecting mechanism removes the old master from the master cylinder clamp 20 and the master is then ejected into a master-receiving tray 99.

PROGRAM CONTROL SYSTEM

The operating sequence of the duplicating machine 10 is effectively controlled by an electrical programming unit 100. This programming unit is selectively responsive to separate mechanical counter assemblies and is actuated thereby to coordinate and control the diverse machine functions which occur during the preduplicating, duplicating and postduplicating phases of machine operation.

The master sequencing control for the programming unit 100 is provided by the combination of a preparation counter assembly 102 and a postpreparation counter assembly 104. The postpreparation counter assembly controls the duplicating and postduplicating phases of operation of the duplicating machine and is substantially the same in construction as the mechanical counter assembly employed for the same purpose in the commercial offset duplicating machine, Model 367A manufactured by the A. B. Dick Company, Chicago, Ill. This counter assembly, which is illustrated in the parts manual for the A. B. Model 367A is basically a ratchet-driven mechanical counter assembly. The ratchet drive (not shown) drives a counter shaft 106 one step for each copy sheet passing through the machine during the duplicating phase and subsequently one step for each rotation of the impression cylinder 18 during the postduplicating phase of operation. The activation of this ratchet drive mechanism is controlled by the energization of a counter clutch solenoid 108 which operates to selectively lock or unlock the counter drive.

The postpreparation counter assembly 104 is set to a desired sheet count by rotating a knob 110 which is connected to rotate a gear segment 112. The movement of the gear segment results in the rotation of a cam bank assembly 116 mounted upon the shaft 106 to a desired start position. The cam bank assembly includes a stop cam 118, a blanket wash cam 120, and a feed-off cam 122 which are nonrotatably mounted upon the shaft 106 and a rundown cam segment 124 which may be rotatably positioned relative to the shaft. It will be noted that the various cams within the postpreparation counter assembly are designed to operate switches positioned adjacent thereto, and it may be observed that the stop cam 118 operates a cycle completion switch 126, the blanket wash cam 120 a blanket wash switch 128, the feed-off cam 122 a feed-off switch 130, the rundown cam 124 a rundown switch 132, and the gear segment 112 an end cycle safety switch 134. The cycle completion switch 1 to 6 is mounted upon a movable frame (not shown) and may be adjusted relative to the stop cam 1 to 18 to set the blanket wash cycle for the duplicating machine 10.

The preparation counter assembly 102 is somewhat similar in construction to the postpreparation counter assembly 104, but unlike the postpreparation counter assembly, the preparation counter controls mechanical as well as electrical machine functions. The preparation counter assembly includes a cam bank assembly 136 which is mounted for rotation upon a shaft 138. Like the postpreparation counter assembly, the preparation counter assembly may be suitably driven by a mechanical ratchet mechanism which is connected to move the shaft 138 one step for each rotation of the master cylinder 14 of the duplicating machine. This ratchet drive assembly is actuated by a preparation counter clutch solenoid 140, which, when energized, permits operation of the ratchet drive in timed relation to master cylinder rotation.

The cam bank assembly 136 of the preparation counter includes a load cam 142 for operating a load switch 144, a liquid systems cam 146 for operating an etch switch 148 and an ink water switch 150, a master control cam 152 for operating a master-forwarding switch 154, and a reset control cam 156 for operating an air switch 158 and a reset switch 160. The cam bank also includes an image control cam 162 for operating an image control cam follower 164 and a feed control cam 166 for operating a feed control cam follower 68. The liquid systems control cam 146 may be adjusted relative to the image control cam 162 to variably control the duration during which ink and water solution will be applied to the offset master. Also, the image control cam 162 can be adjusted about the shaft 138 to vary the duration during which the imaging of the blanket cylinder occurs.

It is important to note that the preparation and postpreparation counter assemblies are operated in response to machine functions rather than on a time basis. This factor enables these counter assemblies to maintain a precise control throughout all duplicating machine cycles regardless of variations in machine speed or adjustment. For example, the print adjust which is conventional on some offset duplicating machines shifts the impression cylinder with relation to the master cylinder, and this adjustment would tend to upset a control counter operating on a time basis. Counters operating on such a time basis must be readjusted for any variation in machine speed, while the machine-driven counter assemblies of this invention automatically adapt to any variation in the machine cycle.

MACHINE SETUP

To initially program the electrical programming unit 100, the control knob 110 for the postpreparation counter assembly 104 is adjusted to a desired sheet count, and as previously described, this results in the positioning of the cam bank assembly 116 for subsequent sequential operation of the switches adjacent to respective cams thereof. Next the position of the cycle completion switch 126 is adjusted to set the desired blanket wash cycle into the counter assembly. If desirable, the position of the rundown cam segment 124 can also be adjusted relative to the rundown switch 132 to vary the rundown cycle for the duplicating machine, but normally this cam segment is not varied for every operational cycle of the duplicating machine.

Similarly, the image control cam 162 of the preparation counter assembly 102 may be adjusted to determine the duration of the blanket cylinder imaging operation which occurs during the preduplicating phase.

Figure 2A:
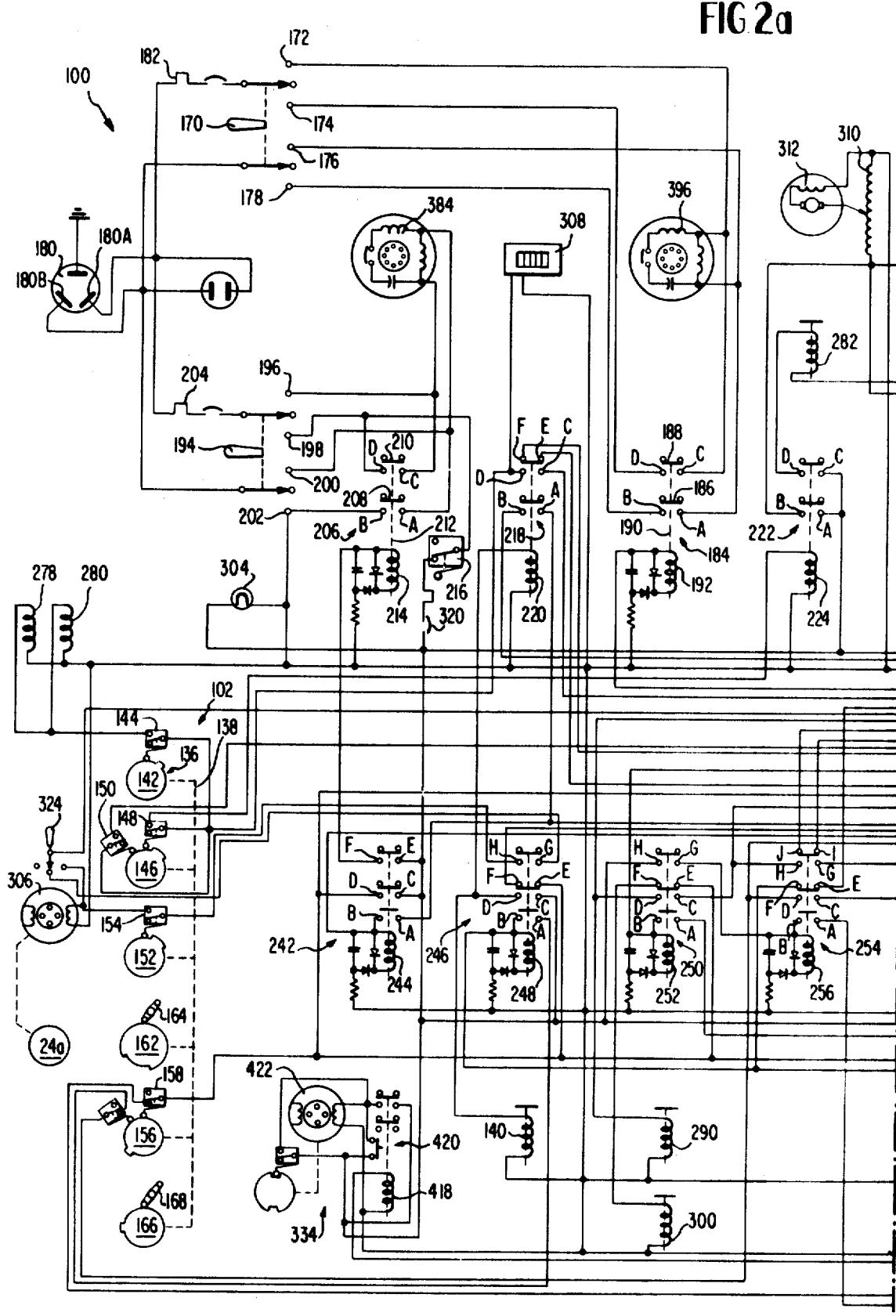
FIG. 2 (*a* and *b*) is a circuit diagram of the program control unit of the present invention.
Figure 2B:
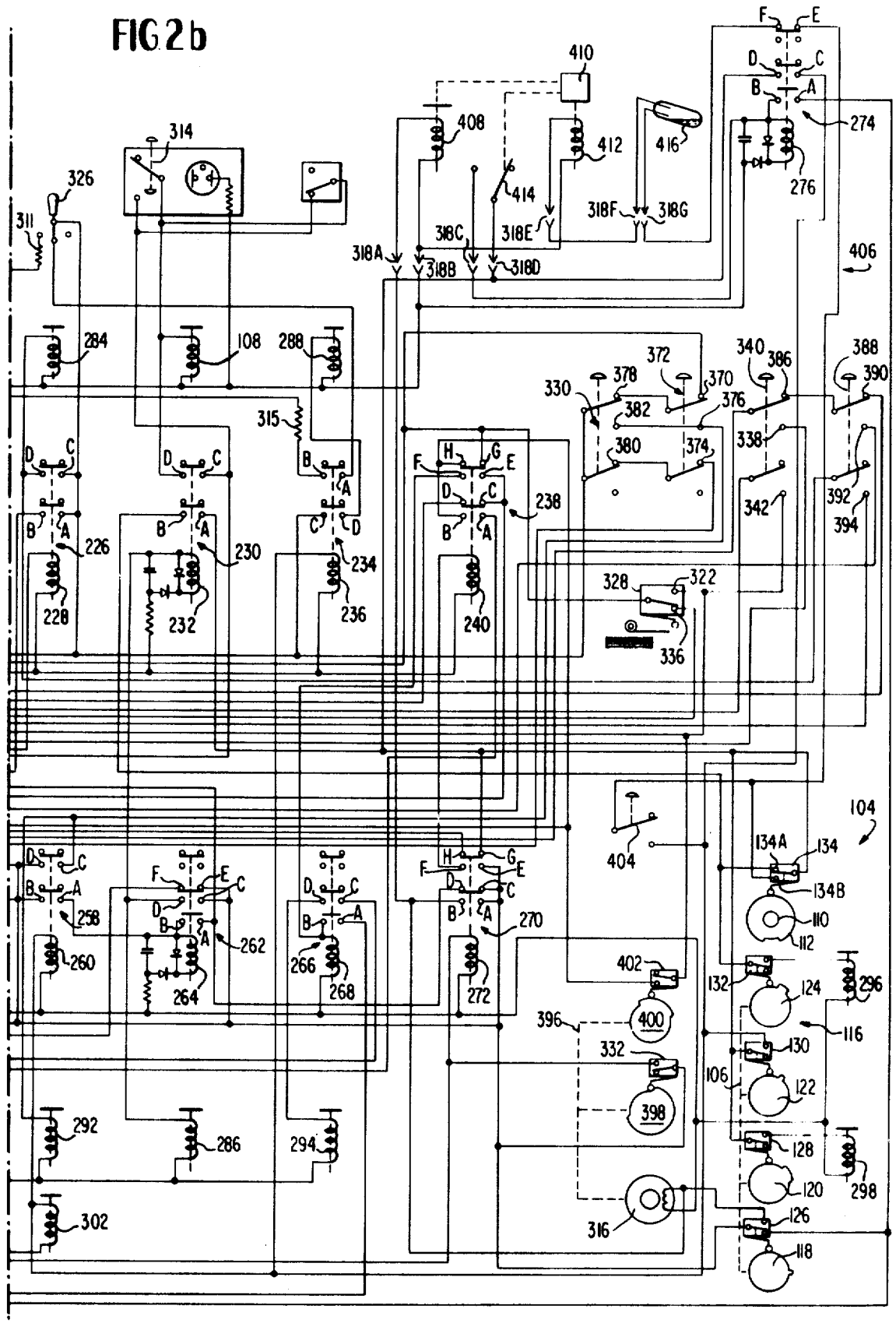

After the postpreparation and preparation counter assemblies have been preset, portions of the programming unit may be manually activated to prepare the control circuit for the preduplicating phase of operation. To accomplish this machine setup operation, a three-position pump motor switch 170 including switch contacts 172, 174, 176, and 178 is switched to the automatic position in FIG. 2. The pump motor switch has three positions indicated as AUTO (automatic), OFF and MAN (manual) and when the switch is in the OFF position, no circuit is completed through the switch. In the manual position, a circuit is completed to contacts 172 and 176, while in the automatic position, a circuit is completed to the contacts 174 and 178. Thus, with the pump motor switch on automatic, a positive electrical circuit extends from the positive side 180A of a line plug 180 through an overload circuit breaker 182 and the switch contact 174 to a solenoid contact 184D of a pump solenoid switch 184. Simultaneously, a negative circuit is completed from a negative contact 180B of the line plug 180 through the pump switch contact 178 to a solenoid contact 184B of the pump motor solenoid switch. For descriptive purposes only, the electrically operated switches in the circuit of the programming unit 100 will be designated "solenoid switches," but it will be recognized that these switches can constitute multicontact relays, such as known double-pole, double-throw relays, or any other suitable electrically operated switching unit. The switch constructions illustrated in FIG. 2 are merely diagrammatic, and it is contemplated that any electrically operated switching unit having a construction which will permit it to provide the switching operations described may be used as the designated "solenoid switches."

The pump solenoid switch 184 includes switch contacts 184A-184B and 184C-184D which may be selectively bridged by switch arms 186 and 188 mounted upon an actuator shaft 190. This actuator shaft moves the switch arms between switch contacts in response to the energization or deenergization of a solenoid coil 192.

After the pump motor switch 170 is placed in the automatic position, a three-position drive motor switch 194 having a construction similar to that of the pump motor switch is similarly moved to the automatic position. The drive motor switch includes switch contacts 196, 198, 200, and 202, and in the manual position, a circuit is completed across the contacts 196 and 200. In the automatic position of the drive motor switch, a positive circuit is completed from the positive terminal 180A of the line plug 180 through an overload circuit breaker 204 and the switch contact 198 to a solenoid contact 206D of a drive solenoid switch 206. The drive solenoid switch includes switch contacts 206A-206B and 206C-206D which may be bridged by switch arms 208 and 210 mounted upon an actuator shaft 212. The actuator shaft 212 moves the switch arms to make or break the electrical circuit across the solenoid switch contacts upon the energization or deenergization of a solenoid coil 214.

In addition to the positive circuit to the solenoid switch contact 206D, movement of the drive switch 194 to the automatic position also provides a positive circuit from the switch contact 198 to a normally open light latch switch 216.

A negative circuit, completed when the drive switch 194 is moved to automatic, extends from the negative terminal 180B of the line plug 180 across the switch contact 202 to the switch contact 206B of the drive solenoid switch 206.

In addition to the pump solenoid switch 184 and the drive solenoid switch 206, the programming unit 100 includes a number of similarly constructed solenoid switches which all include a solenoid coil for operating switch contact bridging members mounted upon an actuator shaft. Briefly, these additional solenoid switches include an auxiliary preparation solenoid switch 218 having a solenoid-operating coil 220, an etch solenoid switch 222 having an operating coil 224, a form on solenoid switch 226 having an operating coil 228, an auxiliary end cycle solenoid switch 230 having an operating coil 232, and eject solenoid switch 234 having an operating coil 236, an auxiliary time-delay solenoid switch 238 having an operating coil 240, a panel solenoid switch 242 having an operating coil 244, a preparation solenoid switch 246 having an operating coil 248, a water-ink solenoid switch 250 having an operating coil 252, a start-restart solenoid switch 254 having an operating coil 256, a form-off solenoid switch 258 having an operating coil 260, an end cycle solenoid switch 262 having an operating coil 264, an air solenoid switch 266 having an operating coil 268 and a time-delay solenoid switch 270 having an operating coil 272. In the automatic position, the drive motor switch 206 completes a negative circuit from the switch contact 202 to the operating coil of each of these solenoid switches.

In some instances, the programming unit 100 will be adapted to receive an auxiliary counter assembly to be hereinafter described, and in such cases, an additional auxiliary counter solenoid switch 274 is provided which includes a control coil 276 connected into the negative circuit from the switch contact 202.

In addition to the solenoid switches previously listed, the programming unit 100 is also provided with a number of mechanical component control solenoids which, when energized, operate various mechanical components of the duplicating machine 10. These control solenoids are included in the negative circuit extending from the switch contact 202, and constitute a master feed solenoid 278, a load solenoid 280, an etch solenoid 282, a form on solenoid 284, a cycle count solenoid 286, an eject solenoid 288, a water solenoid 290, a form-off solenoid 292, an air solenoid 294, a rundown solenoid 296, a blanket wash solenoid 298, an ink ductor solenoid 300, and a feed-off solenoid 302.

Considering now the remainder of the negative circuit which is completed by closing the circuit to the drive motor switch contact 202, it will be noted that a circuit is completed to a pilot light 304, a master forward motor 306, a batch counter 308, a variable resistance device 310, an etch motor 312, a count switch 314, and a time-delay motor 316.

After the drive motor switch 194 is switched to the automatic position, a night latch control handle for the form rollers 52 and 54 is turned to close the night latch switch 216. This causes a positive circuit to be completed across the night latch switch and a circuit breaker 318 to switch contacts 222A and 222C of the etch solenoid switch 222, switch contact 226A of the form on solenoid switch 226, switch contact 234C of the eject solenoid switch 234, switch contacts 242C and 242E of the panel solenoid switch 242, switch contact 250H of the water-ink solenoid switch 250, switch contacts 254C and 254G of the start-restart solenoid switch 254, switch contacts 258B and 258D of the form-off solenoid switch 258, switch contacts 262C and 262E of the end cycle solenoid switch 262, and switch contacts 270A, 270C and 270E of the time-delay solenoid switch 270. A positive circuit is also completed across a master feeler switch 328 to a switch contact 322 and then to a master forward switch 324, the pilot light 304, an etch switch 326, a stop switch 330, a master-sensing switch 332, and the cycle completion switch 126. Also, if a two-position sheet-receiving tray 74 is employed with the duplicating machine 10, the positive circuit is completed to the tray assembly 334.

The programming unit 100 is designed to operate the automated motor-driven etcher assembly 68 of FIGS. 1 and 3. As previously described, this etcher assembly is unlike those previously known, for the etch applicator roller thereof rotates in a direction which is opposed to the direction of rotation of the master cylinder at a variable speed which is different from the rotational speed of the master cylinder.

The metering roller 78 is driven by the etch motor 312, and the speed of the etch motor, and therefore the speed of the metering and etch applicator rollers is controlled by the variable resistance device 310. This device may constitute any suitable voltage control unit for varying the speed of the motor 312.

Normally, the applicator roller 86 of the etcher system must be wet with etching solution before the automatic operation of the duplicating machine 10 is initiated. To achieve applicator roller wetting, the etch switch 326 is moved to the wet position and current flows across the closed etch switch and through a resistor 311 and the variable resistance device 310 to energize the motor 312. The motor drives the metering roller 78 which supplies etching solution to the surface of the applicator roller. Release of the etch switch results in the return of the switch to the automatic position and the deenergization of the etch motor 312.

The resistor 311 plays an important role in the control circuit for the motor 312, for it will be recalled that during the application of etching solution to the master cylinder, this motor drives both the metering roller 78 and the etch applicator roller. As the etch applicator roller is rotating in a direction opposite to the rotational direction of the master cylinder, the motor 312 must draw sufficient power to overcome the frictional forces developed. However, if the motor were to draw the same power during the wetting of the etch applicator roller when this roller is not in contact with the master cylinder, excessive roller speed might result in the discharge of the etch solution from the reservoir and the surface of the rollers. Therefore, the resistor 311 is included in the power circuit for the motor 312 during the period when the etch applicator roller is driven but not in contact with the master cylinder to reduce the power supplied to the motor 312.

The programming unit 100 is designed to be effectively employed with an automatic master feed and loading system of the type illustrated in FIG. 1. Before automatic operation of the duplicating machine 10 is initiated, a master must be forwarded from the master feed tray 22 to the load position against the sheet stop 36. To accomplish this initial master feeding, the master-forwarding switch 324 is moved to the "-forward" position. This completes a circuit across the master-forwarding switch to the master-forwarding motor 306, causing the master-forwarding motor to drive the feed rollers 24a and 24b so that a single master is driven forward from the master feed tray. The master is moved from the master feed tray 22 between the feed rollers 30 and 32 and into the proper position for automatic loading upon the master cylinder 14. The lead edge of the master now rests against the sheet stop 36, and the master contacts and closes master feeler switch 328 to break the circuit from the contact 336 to the master forward switch 324 and master forward motor 306. A new circuit is now established across a master feeler switch contact 322 to the switch contact 254J of the start-restart solenoid switch 254. In the normal position of the start-restart solenoid switch, the switch contacts 254J and 254I are bridged, and therefore a circuit is completed to a switch contact 338 of a manual start switch 340. This start switch forms the starting switch for the duplicating machine 10, and it is noteworthy that this switch cannot be effective until a master is properly positioned for loading on the master cylinder of the machine.

MACHINE STARTING

To start the duplicating machine 10 after the setup operation is completed, the start switch 340 is depressed to allow current to flow across the start switch from the switch terminal 338 to energize the coil 244 of the panel solenoid switch 242. Energization of the coil 244 causes the panel solenoid switch to close and all of the switch contacts 242A to 242F are bridged. A holding circuit is now established across the bridged contacts 242B-242A and across the normally bridged switch contacts 238G and 238H of the auxiliary time-delay solenoid switch 238 to a switch contact 370 of a stop switch 372. The stop switch 372 includes normally closed switch contacts 370 and 374, so that the holding circuit from the switch contact 370 extends to a switch contact 378 for the normally closed emergency stop switch 330. The emergency stop switch has normally closed switch contacts 378 and 380 and a normally open switch contact 382. It will be recalled that a positive circuit was completed to the emergency stop switch by the closing of the night latch switch 216, so that a complete holding circuit is now established. This holding circuit can be interrupted, thereby deenergizing the coil 244 of the panel solenoid switch 242 by breaking the circuit from the switch contact 374 across the stop switch 372 or the circuit from the switch contact 380 across the emergency stop switch 330. The holding circuit will also be broken by moving the drive motor switch 194 away from the automatic position.

Returning now to the energized panel solenoid switch 242, it will be observed that upon the completion of the circuit to the coil 244 and the closing of the switch, several events occurred simultaneously. As described, the holding circuit was completed, but also, current is permitted to flow across the bridged contacts 242E-242F to energize the coil 214 of the drive solenoid switch 206, thereby causing all of the switch contacts, 206A-206D, to be bridged. A negative circuit is now completed across the solenoid switch contacts 206B-206A to a drive motor 384, while similarly, a positive circuit is completed across the switch contacts 206D-206C to the drive motor. This drive motor constitutes the cylinder drive for the duplicating machine 10, and upon energization of the coil 214 of the drive solenoid switch 206, power is provided to the drive motor and rotation of the machine cylinders 14, 16 and 18 is initiated.

The last circuit completed by the panel solenoid switch 244 constitutes a main distribution circuit for many of the component control circuits of the programming unit 100. It will be noted that upon completion of the circuit across the switch contacts 242C-242D of the panel solenoid switch, this distribution circuit runs to the switch contacts 246C and 246E of the preparation solenoid switch 246, the switch contact 250E of the water-ink solenoid switch 250, the switch contact 266C of the air solenoid switch 266, and the switch contacts 238C and 238E of the auxiliary time-delay solenoid switch 238. Also, the circuit is completed across the normally closed cam-operated air switch 158 to the switch contact 266C of the air solenoid switch 266.

Current flow across the normally bridged switch contacts 250E-250F of the water-ink solenoid switch 250 results in current flow to the ink ductor solenoid 300, and energization of this solenoid results in the operation of an ink ductor lockout mechanism which prevents the ducting of ink by the ink ductor roller 40.

Turning back to the pressed start switch 340 which initially caused the energization of the coil 244 of the panel solenoid switch 242, it will be noted that a second circuit is completed from the switch contact 342 across the start switch to the normally bridged switch contacts 254E-254F of the start-restart solenoid switch 254. This circuit then extends from the switch contacts 254E-254F to the solenoid coil 248 of the preparation solenoid switch 246. The energization of the coil 248 results in the bridging of the switch contacts 246A-246B, 246C-246D, and 246G-246H of the preparation solenoid switch, and a holding circuit is established across the switch contacts 246B-246A, the normally closed reset switch 160, to the switch contact 374 and across the normally closed stop switch 372 to the switch contact 380 and across the normally closed emergency stop switch 330.

With the substantially instantaneous establishment of the heretofore described circuits by the closing of the start switch 340, the start switch may be released breaking the contact to the switch contacts 338 and 342. Upon release of the start switch, a circuit will be completed from the coil 244 of the panel solenoid switch 242 across the start switch 340 to a switch contact 386 and then across a normally closed restart switch 388 to a switch contact 390. The restart switch 388 includes the normally closed contact 390 and two normally open switch contacts 392 and 394. From the restart switch contact 390, the circuit is then completed to the coil 192 of the pump solenoid switch 184, thereby resulting in the bridging of all the pump solenoid switch contacts 184A-184D. A negative circuit now extends across the solenoid switch contacts 184B-184A to a pump motor 396, while a positive circuit extends to the pump motor across the bridged pump solenoid switch contacts 184D-184C. The pump motor is now energized to drive a compressor which provides air and vacuum for operation of various components of the duplicating machine 10.

In addition to the holding circuit established by the bridging of the switch contact 246B-246A of the preparation solenoid switch 246, the energization of the coil 248 results in several additional simultaneous operations. First, the bridging of the switch contacts 246C-246D results in the termination of the circuit across the switch contacts 246E-246F, thereby interrupting the circuit to the normally bridged switch contacts 270H-270G of the time-delay solenoid switch 270. The interruption of this circuit prevents a circuit from being completed to the switches 128, 130, 132, and 134 of the postpreparation counter assembly 104, and thereby ensures against accidental operation of the postpreparation counter assembly during the preduplicating phase of operation of the duplicating machine 10. However, current will now flow across the bridged contacts 246C-246D of the preparation solenoid switch 246 to energize the coil 220 of the auxiliary preparation solenoid switch 218 and the preparation counter solenoid 140. This completes the initial start operation for the duplicating machine, and the machine is now prepared to enter the automated preduplicating phase of operation.

PREDUPLICATING PHASE

The operation of the start switch 340 and the resulting energization of the circuits described initiates the automated operating cycle of the duplicating machine 10. With the circuit now complete across the switch contacts 242C and 242D of the panel solenoid switch 242, current is permitted to flow across the normally bridged contacts 238C-238D of the auxiliary time-delay solenoid switch 238 to and across the now bridged contacts 218C-218D of the auxiliary preparation solenoid switch 218. From the switch contact 218D, current is provided to energize the batch counter 308 and the counter is caused to register one count. Current is also provided to the load switch 144, the etch switch 148, and the ink-water switch 150 of the preparation counter assembly 102. The previously energized preparation counter solenoid activates the drive for the preparation counter assembly 102, and the cam bank 136 of the preparation counter assembly is now advanced one step for each revolution of the blanket cylinder 16.

As the cam bank 136 of the preparation counter assembly is stepped, the load cam 142 closes the load switch 144 and a circuit is completed to simultaneously energize the load solenoid 280 and the master feed solenoid 278. The master feed solenoid when energized, permits the pivoted mount 34 to drop the upper feed roller 32 and the sheet stop 36 so that the master which has been positioned adjacent the master cylinder for loading is permitted to move forward to the master cylinder. Simultaneously, the load solenoid operates to open mechanical clamp 20 on the master cylinder so that the master being fed thereto may be received. The configuration of the load cam 142 will permit the load and master feed solenoids to be energized for one revolution of the master cylinder, and after this revolution, the load switch will open breaking the circuit to the master feed and load solenoids. At this time, the load solenoid will be deenergized, causing the master clamp on the master cylinder to grip and retain the loaded master.

Also, with the closing of the load switch 144, the etch switch 148 is closed by the etch cam 146. Current will now flow across the etch switch to energize the coil 224 of the etch solenoid switch 222, thereby causing all of the switch contacts, 222A through 222D to be bridged. A circuit is now completed across the contacts 222C-222D to energize the etch solenoid 282 which causes the pivoted support arms 74 of the etcher assembly 68 to move the etch applicator roller against the master cylinder to provide etching solution to the master now secured on the surface of the master cylinder.

The energized etch solenoid switch 222 also permits current flow across the bridged switch contacts 222A-222B to the variable resistance device 310 and the etch drive motor 312. This motor now drives the metering roller 78 to provide etch solution to the applicator roller 86 which is in contact with the rotating master cylinder and a continuous supply of etching solution is supplied to the master.

The etch switch 148 is closed by the etch cam 146 for two revolutions of the master cylinder, and at the termination of these revolutions, the etch switch will open breaking the circuit to the etch solenoid switch 222, the etch motor 312, and the etch solenoid 282. This terminates the operation of the automatic etching unit and the applicator roller is withdrawn from the surface of the master cylinder.

The preparation counter assembly 102 has now programmed the duplicating machine 10 through the first and second steps of the preduplicating phase of operation; namely the automatic loading of the master and the automatic application of etching solution thereto. On the third revolution of the master cylinder after the preparation counter solenoid 140 has been energized, the etch cam 146 will close the ink-water switch 150, and the circuit will be completed to energize the coil 228 of the form on solenoid switch 226. Switch contacts 226C-226D are now bridged, resulting in the energization of the form on solenoid 284 which is operatively connected to operate the form rollers 52 and 54 for the duplicating machine 10. The form on solenoid may operate a form roller assembly of the type employed in the A. B. Dick Model 367A Offset Duplicator whereby energization of the solenoid causes the form rollers to move against the master cylinder. Ink and fountain solution will now be transferred to the master from the form rollers.

The operation of the form on solenoid switch 226 also results in current flow across the switch contacts 226A-226B to energize the coil 252 of the water-ink solenoid switch 250. A holding circuit is now established across the contacts 250B-250A of the water-ink solenoid switch and across the normally bridged switch contacts 262F-262E of the end cycle solenoid switch 264. This holding circuit permits the water-ink solenoid switch coil to remain energized after the circuit is broken across the ink-water switch 150.

In addition to the holding circuit across the switch contacts 250B-250A of the water-ink solenoid switch 250, the energization of the solenoid coil 252 also results in the bridging of solenoid switch contacts 250C-250D and 250G-250H and the interruption of the circuit across the previously bridged switch contacts 250E-250F. The current flow to the ink ductor solenoid 300 is now terminated, permitting ink to be metered from the ink fountain through the ink system to the form rollers.

The initiation of current flow across the bridged contacts 250H–250G completes the circuit to the coil 256 of the start-restart solenoid switch 254. The operation of this solenoid switch results in current flow across the bridged switch contacts 254G–254H of the start-restart solenoid switch and across the now bridged switch contacts 250C–250D of the water-ink solenoid switch to energize the water solenoid 290. This water solenoid operates a suitable mechanical ductor assembly to cause the ductor roller 60 to provide water or fountain solution from a reservoir to the form rollers of the duplicating machine 10.

When the coil 256 of the start-restart solenoid 254 was energized, a holding circuit was established across the bridged switch contacts 254B–254A to the normally closed cycle completion switch 126. This holding circuit permits the start-restart solenoid switch coil to remain energized after the circuit is broken across the solenoid coil 252 of the water-ink solenoid switch 250.

The circuit across the ink-water switch 150 is broken by the cam 146 upon the completion of the fourth revolution of the master cylinder. The form on relay 284 is now deenergized, but upon the deenergization of the form on relay, the form rollers of the machine remain in engagement with the master cylinder 14.

It will be noted that when the master forward switch 324 is in the automatic position and the solenoid coil 248 of the preparation solenoid switch 246 is energized, a circuit will be completed across the bridged switch contacts 246G–246H to the master-forwarding switch 154. The master-forwarding switch will be closed for three revolutions of the master cylinder by the master-forwarding cam 152, and this will result in the energization of the master-forwarding motor 306. The master-forwarding motor will revolve driving the feed rollers 24a and 24b to cause a new master to be moved from the master feed tray 22 into contact with the master feeler switch 328 and the sheet stop 36 as previously described. The master will thus actuate the master feeler switch 328 to break the circuit to the switch contact 336 and complete a circuit to the switch contact 322. With the termination of the circuit to the switch contact 336, the operation of the master-forwarding motor 306 will cease.

The next function to be performed by the preparation counter assembly 102 is the initiation of a mechanical operation which results in the imaging of the cylinder 16. This imaging function is begun by the image cam 162 which trips a lever 164 for a duration of from one to six revolutions of the master cylinder depending upon the preset position of the image cam. The lever 164 operates a mechanical assembly which locks the master cylinder into contact with the blanket cylinder so that a transfer of the inked image from the master to the blanket cylinder occurs. Mechanisms for operating the master cylinder in this manner are included in the A. B. Dick Model 367A and are also illustrated in U.S. Pat. No. 2,860,577 to Wallace R. Fowlie.

During this imaging operation, the normally closed air switch 158 is opened by the reset control cam 156, and a holding circuit across the switch contacts 266B–266A of the air solenoid switch 266 is broken. This breaks the circuit across the switch contacts 266C–266D of the air solenoid switch so that the air solenoid 294 is deenergized. The air solenoid is connected to a selective valve system for controlling the flow of air and vacuum from the compressor driven by the pump motor 396, and deenergization of the air solenoid causes the valve system to provide air and vacuum for operation of the sheet-feeding system for the duplicating machine. When the air solenoid is energized, the valve system causes air to be provided to a blanket-drying system employed in the duplicating machine. The valve system for selectively controlling the flow of air and vacuum from the compressor driven by the pump motor 396 may be of the type disclosed in a copending application entitled "Air and Vacuum Control Mechanism," in which John P. Gallagher is the inventor and is assigned to the same assignee as this invention, A. B. Dick Company.

Upon completion of the imaging operation, the machine is ready to receive copy sheets, and the preparation counter assembly causes sheet feeding to begin. This is accomplished by the feed cam 166 which engages and operates a lever 168 mechanically connected to initiate sheet feeding through the duplicating machine 10. The lever 168 may mechanically operate any suitable sheet-feeding unit, such as the sheet-feeding unit illustrated by U.S. Pat. No. 2,860,577 to Wallace R. Fowlie, issued Nov. 18, 1958.

At the same instant that the sheet feed lever 168 is actuated, the reset control cam 156 will open the reset switch 160 to break the holding circuit across the switch contacts 246B–246A of the preparation solenoid switch 246. This results in the deenergization of the coil 248 of the preparation solenoid switch and the interruption of the circuit across the switch contacts 246C–246D, which in turn causes the deenergization of the coil 220 of the auxiliary preparation solenoid switch 218. Thus, the circuit across the switch contacts 218C–218D of the auxiliary preparation solenoid switch is broken and current flow to the preparation counter solenoid 140 and the switches 144, 148 and 150 of the preparation counter assembly is terminated.

With the deenergization of the preparation counter solenoid 140, and the termination of current flow to the switches of the preparation counter 102, the preparation counter is permitted to reset itself to its initial position. This may be accomplished by spring loading the cam bank mounted on the counter shaft 138.

The termination of current flow to the solenoid coil 248 of the preparation solenoid switch causes the circuit across the switch contacts 246G–246H to be broken, thereby interrupting the flow of current to the master-forwarding switch 154. Also the circuit across the switch contacts 246C–246D of the preparation solenoid switch is broken resulting in the reestablishment of the circuit across the switch contacts 246E–246F. Current flow is now permitted to pass across the switch contacts 246E–246F and the normally closed switch contacts 270H–270G of the time-delay solenoid switch 270.

The deenergization of the coil 220 of the auxiliary preparation solenoid switch 218 restores the circuit across switch contacts 218E–218F and current passes across these contacts from the contacts 270C–270 of the time-delay solenoid switch 270. From contact 218F, the circuit is now complete through the count switch 314 to the sheet counter solenoid 108. The sheet counter solenoid in turn activates the counter drive for the postpreparation counter assembly 104 and causes this counter to move one step for each copy sheet fed through the duplicating machine. The preduplicating cycle for the duplicating machine is now completed and, with the resetting of the preparation counter assembly 102, the control of the programming unit 100 is assumed completely by the postpreparation counter assembly.

DUPLICATING PHASE

The completion of the preduplicating phase of operation and the start of copy sheet feeding marks the beginning of the duplicating phase of machine operation during which single copy sheets are fed through the duplicating machine and subsequently discharged as printed copy sheets. As each copy sheet is fed to the duplicating machine, the postpreparation counter assembly 104 advances one step, and the cams of the cam bank 116 move toward the switches 126, 128, 130, and 132. For purposes of illustration, assume that the postpreparation counter assembly has been programmed to permit 10 copy sheets to feed through the duplicating machine. With the feeding of each copy sheet, the cam bank 116 will rotate in a counterclockwise direction toward the adjacent switches until the feeding of a predetermined number of sheets less than 10 is accomplished. At this point, the adjustable rundown cam segment 124 will contact and close the rundown switch 132. This rundown cam segment may be prepositioned so that it closes the rundown switch before the last few sheets programmed for the duplicating phase are fed; for example the last two, three or four sheets. Upon closing, the rundown switch permits current to flow from the switch contact 270G of the time-delay solenoid switch 270, across the end cycle safety switch 134 and then across the rundown switch to energize and activate the rundown solenoid 296. The rundown solenoid is connected to the master cylinder locking assembly previously operated by the link 164 to bring the master cylinder into contact with the blanket cylinder, and upon activation of the rundown solenoid, this locking assembly is operated to disengage the master cylinder from the blanket cylinder. Thus, the last few copy sheets counted by the postpreparation counter assembly are fed through the machine with the master cylinder out of contact with the blanket cylinder to remove some of the ink image from the surface of the blanket cylinder. This results in a reduction of the blanket wash cycles necessary to clean the blanket cylinder during the postduplication phase of machine operation.

When the final copy sheet is fed through the duplicating machine, the feed-off cam 122 will contact and close the feed-off switch 130 thereby permitting current to flow across the feed-off switch to energize the feed-off solenoid 302, the coil 260 of the form-off solenoid switch 258, and the coil 236 of the eject solenoid switch 234. The feed-off solenoid is connected to operate the feed mechanism previously actuated by the mechanical feed lever 168, and upon activation of the feed-off solenoid, the feed system is caused to terminate the feeding of copy sheets between the blanket and impression cylinders. This terminates the duplicating phase of operation for the duplicating machine 10.

POSTDUPLICATING PHASE

With the energization of the coil 260 of the form-off solenoid switch 258, the postduplicating phase of operation begins. Current is now permitted to flow across the bridged contacts 258B–258A and 258D–258C of the form-off solenoid switch, and from the switch contact 258C, current flows to energize the form-off solenoid 292. The form-off solenoid is mechanically connected to the operating mechanism for the form rollers 52 and 54, and when energized, operates to retract the form rollers from the master cylinder.

Also, the current across switch contacts 258B–258A flows to energize the coil 264 of the end cycle solenoid switch 262.

The simultaneous energization of the eject solenoid switch coil 236 causes the switch contacts 234C–234D to be bridged, and current flows to the eject solenoid 238. The eject solenoid is mechanically connected to operate an eject mechanism of any suitable known type which is associated with the master-clamping unit 20, and this causes the release of the master printing sheet previously retained on the master cylinder.

Current also flows from across the closed etch switch 326 and the now closed switch contacts 234A–234B of the eject solenoid switch 236, and a resistor 315 to the variable resistance device 310 and the etch motor 312. The etch motor will again rotate to meter etch solution to wet the applicator roller 86. It will be noted that the resistor 315 operates to provide the same function in the automatic wetting of the applicator roller that was provided by the resistor 311 during the manual wetting of the roller.

Turning now to the end cycle solenoid switch 262, with the energization of the solenoid switch coil 264, the circuit will be broken across the switch contacts 262E–262F while a new circuit will be completed across the switch contacts 262A–262B and 262C–262D. Thus a holding circuit results which extends across the closed switch contacts 262B–262A and across the closed switch contacts 270D–270C of the time-delay solenoid switch 270. This holding circuit permits the solenoid coil 264 of the end cycle solenoid switch to remain energized after the feed-off switch 130 is opened by the feed-off cam 122.

The circuit established across the switch contacts 262C–262D permits current to flow to the cycle count solenoid 286 which is connected to control the mechanical drive for the postpreparation counter assembly 104. Energization of the cycle count solenoid causes the counter drive to move the cam bank 116 of the postpreparation counter assembly one step for each revolution of the impression cylinder 18 of the duplicating machine. Thus the programming unit 100 is controlled by impression cylinder rotation during the postduplicating phase of operation.

As has been indicated, with the completion of the circuit across the switch contacts 262C–262D of the end cycle solenoid switch the previously completed circuit across the switch contacts 262E–262F is broken. This results in the interruption of the holding circuit across the switch contacts 250B–250A of the water-ink solenoid switch 250, and the coil 252 becomes deenergized. Deenergization of this coil interrupts the previously completed circuit across the switch contacts 250A–250B, 250C–250D, and 250G–250H while reestablishing the circuit across the switch contacts 250E–250F. Thus, with the termination of the circuit across the switch contacts 250C–250D, the water solenoid 290 is deenergized to stop the flow of fountain solution to the form rollers 52 and 54. At the same time, the reestablished circuit across the switch contacts 250E–250F provides current flow to energize the ink ductor solenoid 300 which in turn operates a ductor lockout assembly to terminate the flow of ink to the form rollers.

It will be noted that when the end cycle solenoid switch 262 was energized to complete the circuit to the cycle count solenoid 286, a second circuit from the switch contact 262D was also completed to the coil 232 of the auxiliary end cycle solenoid switch 230. The operation of the auxiliary end cycle solenoid switch is required to activate interlocking circuits to be employed in alternate modes of operating the duplicating machine 10, and the purpose of this solenoid switch will be hereinafter explained.

The impression cylinder 18 has now completed one revolution after the activation of the cycle count solenoid 286 to begin the postduplicating cycle count, and as the impression cylinder begins its second revolution, the blanket wash cam 120 will trip the blanket wash switch 128. Current will now flow across the blanket wash switch to the blanket wash solenoid 298, and this solenoid is then caused to operate a suitable blanket wash mechanism. The blanket wash mechanism might, for example, constitute a scrubbing roll which is moved into contact with the blanket cylinder by the blanket wash solenoid to remove the remaining image from the blanket cylinder. This blanket wash operation will continue until the postduplicating phase of machine operation is terminated by the cycle completion switch 126.

After the second revolution of the impression cylinder during the postduplicating phase, the feed-off cam 122 permits the feed-off switch 130 to open, and the circuit to the solenoid coils of the form off and eject solenoid switches 258 and 234 is interrupted. However, the coil 264 of the end cycle solenoid switch 262 remains energized through the holding circuit established across the switch contacts 262A–262B.

The postpreparation counter assembly 104 will continue to step one step for each cycle of revolution of the impression cylinder 18 and blanket washing will continue until the stop cam 118 trips the cycle completion switch 126. At this point, the preset blanket wash cycle has been completed and the postduplicating phase of operation of the duplicating machine 10 is at an end. During the subsequent fraction of a second, the postpreparation counter assembly will reset itself and the programming unit 100 will sense whether to shut the duplicating machine down or to load a new master and initiate a new programmed cycle of operation.

MASTER-SENSING PHASE

With the tripping of the cycle completion switch 126 by the stop cam 118, the holding circuit across the switch contacts 254A–254B to the coil 256 of the start-restart solenoid switch 254 will be broken, and the coil 256 will be deenergized. The cycle completion switch will then complete a circuit to the delay timer motor 316 which will begin to turn and drive a shaft 396 upon which are mounted a reset cam 398 and a master-sensing cam 400. The master-sensing cam operates a master-sensing switch 402, and upon rotation closes the master-sensing switch to determine if a new master has been positioned over the master feeler switch 328 during the previous preduplicating phase of machine operation.

Also, the reset cam 398 will be driven to close the reset switch 332. Current will now flow across the reset switch to energize a solenoid coil 418 of a two-position tray solenoid switch 420. This causes the solenoid switch 420 to close permitting the energization of a tray motor 422 which, in turn, drives the two-position sheet-receiving tray 98 to a new position. It should be understood that the two-position sheet-receiving tray is an optional feature which may be included on the duplicating machine in place of a conventional stationary receiving tray. This tray changes position at the termination of each individual duplicating cycle of operation of the duplicating machine so that the copy sheets produced from successive masters may be segregated.

Current also flows across the reset switch 332 to the coil 272 of the time-delay solenoid switch 270, and the previously completed circuits across the switch contacts 270H–270G and 270D–270C are broken when the coil energizes. However, circuits are now completed across the switch contacts 270E–270F and 270A–270B, and current flows from the switch contact 270B to the delay timer motor 316. This forms a holding circuit which will permit the delay timer motor to continue running when the cycle completion switch is released by the stop cam 118. Thus, the delay timer motor 316 will continue to run until the circuit across the reset switch 332 is broken.

The current across the switch contacts 270E–270F energizes the coil 240 of the auxiliary time-delay solenoid switch 238. Now current from across the switch contacts 242C–242D of the panel solenoid switch 242 is permitted to pass across the switch contacts 238E–238F of the auxiliary time-delay solenoid switch and then to the coil 268 of the air solenoid switch 266. Energization of the coil 268 results in the establishment of a circuit across the switch contacts 266A–266B and 266C–266D, and a holding circuit is formed from the switch contact 266A across the normally closed air switch 158 to the switch contact 242D of the panel solenoid switch 242. At the same time, current will flow across the contacts 266C–266D of the air solenoid switch to energize the air solenoid 294. The control valve in the air and vacuum system for the duplicating machine will now cause air to be furnished to a suitable blanket-drying system, and the blanket cylinder 16 will be dried during the next preduplicating phase, to remove the wash solution applied thereto during the previous blanket-washing cycle.

In addition to the holding circuit established for the delay timer motor 316 and the energization of the air solenoid 294, the provision of current to the coil 272 of the time-delay solenoid switch 270 also results in the interruption of several circuits as has been previously indicated. First, the circuit across the switch contacts 270C–270D is broken thereby breaking the holding circuit to the coil 264 of the end cycle solenoid switch 262, and the coil is deenergized. This in turn results in the interruption of the circuit across the switch contacts 262C–262D to the coil 232 of the auxiliary end cycle solenoid switch 230, and this coil is similarly deenergized. At the same time, the circuit is interrupted to the cycle count solenoid 286, and the deenergization of this solenoid terminates the operation of the postpreparation counter assembly 104 so that the cam bank 116 thereof ceases to advance with subsequent rotations of the impression cylinder.

Secondly, the energization of the coil 272 breaks the circuit across the switch contacts 270H–270G, and the current flow therefrom across the count switch 314 to the sheet counter solenoid permits the cam bank 116 of the postpreparation counter assembly to reset itself to the initial, predetermined sheet count position. The postpreparation counter is in condition to reinstitute a sheet count identical to that just completed.

If the supply of master sheets from the master feed tray 22 is exhausted and no master was positioned over the master feeler switch 328 during the previous preduplicating phase of machine operation, the master feeler switch will remain open and no current will flow across the master-sensing switch 402 when it is closed by the master-sensing cam 400. Thus no circuit is established from the master-sensing switch across the contacts 242A–242B of the panel solenoid switch 242 to the switch coil 244, and the coil 244 is deenergized when the established holding circuit thereto across the switch contacts 238H–238G is interrupted by the energization of the coil 240 of the auxiliary time-delay solenoid switch. With the deenergization of the panel solenoid switch coil 244, the circuit across the switch contacts 242C–242D and 242E–242F is broken and the duplicating machine 10 will stop.

However, assuming that a master is properly positioned for loading onto the master cylinder, the master feeler switch 328 will be closed, and when the master-sensing switch 402 closes, a circuit is completed across the contacts 242A–242B of the panel solenoid switch 242 to the solenoid switch coil 244. Thus the panel solenoid switch coil remains energized when the auxiliary time-delay solenoid coil 240 is energized breaking the contact across the switch terminals 238H–238G.

Upon energization of the coil 240 of the auxiliary time-delay solenoid switch, a circuit is established across the switch terminals 238A–238B to the coil 248 of the preparation solenoid switch 246. Operation of this coil results in the formation of a holding circuit across the switch contacts 246B–246A, the normally closed reset switch 160, to the switch contact 374 and across the normally closed stop switch 372 to the switch contact 380 and thus across the normally closed emergency stop switch 330.

The coil 248 of the preparation solenoid switch 246 operates the switch so that current is again caused to flow across the switch contacts 246C–246D to energize the coil 220 which operates the auxiliary preparation solenoid switch 218. Thus, the circuit is again completed across the bridged contacts 218C–218D of the auxiliary preparation solenoid switch, but at this time, the preparation counter assembly will not operate, for the circuit to the preparation counter solenoid 140 across the switch contacts 218C–218D is interrupted by the energized auxiliary time-delay solenoid switch 238.

The delay timer motor 316 continues to advance until the master-sensing cam 400 causes the master-sensing switch 402 to open breaking the circuit from the master feeler switch 328. However, the holding circuit to the coil 244 of the panel solenoid switch will be momentarily maintained from across the now bridged contacts 218B–218A of the auxiliary preparation solenoid switch 218.

The delay timer motor 316 subsequently causes the reset cam 398 to break the circuit across the reset switch 332, thereby interrupting the circuit to the solenoid coils 272 and 240 of the time-delay solenoid switch 270 and the auxiliary time-delay solenoid switch 238. The contacts 238C–238D of the auxiliary time-delay solenoid switch are again bridged, and current again flows across the closed switch contacts 218C–218D of the auxiliary preparation solenoid switch 218 to the switches 144, 148 and 150 of the preparation counter assembly 102. The preparation solenoid 140 is energized and, as the delay timer motor 316 stops with the deenergization of the time-delay solenoid switch coil 272, the preparation counter assembly initiates a new preduplicating phase of machine operation.

SUMMARY OF MACHINE OPERATION

The controlled operation provided by the programming control unit 100 will become apparent upon a brief review of the complete operational cycle of the duplicating machine 10 which has been described in detail. It will be recalled that the pump switch 170 and drive motor switch 194 were moved to the automatic position and the night latch switch 216 was closed. The preparation counter assembly 102 was then programmed for a given number of image cycles, and the postpreparation counter assembly 104 was set to a predetermined sheet count. The blanket wash cycle was also programmed for a given count by adjusting the position of the cycle completion switch 126 relative to the stop cam 118. The count switch 314 was then closed.

Next the etch switch 326 was depressed momentarily to energize the etch motor 312 and cause the wetting of the applicator roller 86. The master feed tray 22 was then loaded with masters and the master forward switch 324 was momentarily depressed to forward a master into load position against the sheet stop 36.

With the forwarding of a master, the duplicating machine 10 was ready to start. The start switch 340 was depressed, resulting in the energization of the drive motor 384 which initiated the rotation of the cylinders of the duplicating machine. With the release of the start switch, the pump motor 396 started to provide air and vacuum to the sheet-feeding mechanism for the duplicating machine. The preparation counter assembly 102 now commenced to count machine revolutions, and the master-printing sheet was prepared for duplicating by the instantaneous opening of the master cylinder clamp 20 on the master cylinder, the forwarding of the master-printing sheet to the master cylinder clamp, the clamping of the master in place, and the etching of the master by the applicator roller 86. Subsequent etching and inking of the master printing sheet was accomplished by turning on the ink and fountain supply. A new master was then forwarded to the load position from the master stack on the feed tray 22.

Next the master cylinder 14 was brought into contact with the blanket cylinder 16 to develop an image on the blanket cylinder, and then an air valve in the air and vacuum system was operated by the deenergization of the air solenoid 294 to provide air and vacuum for sheet feeding. The sheet feed was turned on and the preparation counter assembly 102 actuated the post-preparation counter assembly 104 before resetting itself.

During the duplicating phase of machine operation, a predetermined number of copy sheets counted by the postpreparation counter assembly were fed through the duplicating machine. At a predetermined rundown count before the last-programmed copy sheet was fed, the postpreparation counter assembly caused the rundown solenoid 296 to operate to separate the master and blanket cylinders. However, sheet feeding continued until the predetermined sheet count was reached, and at this point the sheet feed was shut off. Then the master printing sheet was ejected from the master cylinder, the form rollers were turned off, the ink and fountain supply was shut off and the blanket washer was engaged to remove the old image from the blanket cylinder.

Upon completion of the blanket wash operation, a time delay was started by a delay timer motor 316 and, if employed, a two-position sheet-receiving tray 334 was advanced to an alternate position. The air valve in the air vacuum system was then operated by the energization of the air solenoid 294 so that a blanket-drying assembly received air to remove cleaning fluid from the blanket cylinder. The postpreparation counter assembly 104 reset itself and the programming unit 100 sensed to see if a new master-printing sheet was present in the load position so that a new cycle of machine operation could begin.

The programming control unit 100 will cause the duplicating machine 10 to continue to automatically feed masters and duplicate a predetermined number of copies until the master supply is depleted or until the machine is otherwise shut down.

RANDOM RUNS

At times it will be desirable to deactivate the postpreparation counter assembly 104 when copies to be run through the duplicating machine 10 are of mixed nature. For running copies of this type, the operator will control the number of sheets to be fed by manually ending the duplicating phase of machine operation to institute the postduplicating phase.

To obtain random run operation, the count switch 314 must be opened to prevent energization of the sheet counter solenoid 108. Thus, when the sheet feed for the duplicating machine is activated, the postpreparation counter assembly will not advance as copy sheets are fed through the machine. However, during the machine setup operation, the postpreparation counter assembly must be set to the one sheet count position by adjusting the control knob 110. In this position, the end cycle safety switch 134 will be actuated by the cam segment 112 so that the circuit to a switch contact 134A is broken and the circuit is completed to the switch contact 134B.

With the machine programmed in this manner, the normal starting operation is performed to cause the programming unit 100 to sequence the machine through the preduplicating phase of operation in the previously described manner. The only variation in machine operation for a random run exists during the actual duplicating phase of operation when the postpreparation counter assembly 104 is inoperative. The operator runs all but one of the desired number of copies through the duplicating machine during the duplicating phase of operation and then presses an end cycle switch 404. This results in current flow across the end cycle safety switch 134 to the switch contact 134B, and then across the closed end cycle switch 404 to the feed-off solenoid 302 and the coil 260 of the form-off solenoid switch 258. With the form-off solenoid switch actuated, current is provided across the switch contacts 258B-258A to energize the coil 264 of the end cycle solenoid switch 262, and current is then provided across the switch contacts 262C-262D to energize the coil 232 of the auxiliary end cycle solenoid switch 230. The operation of the coil 232 permits current to flow across switch contacts 230A-230B of the auxiliary end cycle solenoid switch to the rundown switch 132 which is closed by the cam segment 124 when the postpreparation counter assembly is set in the number one sheet count position. Thus, current flows through the rundown switch to energize the rundown solenoid 296 and move the master cylinder away from the blanket cylinder. The final copy sheet is now fed between the blanket and impression cylinders.

Returning back to the auxiliary end cycle solenoid switch 230, it will be noted that when the coil 232 is energized, a circuit will be completed across the switch contacts 230C-230D to energize the sheet counter solenoid 108. Also, the cycle count solenoid 286 is energized upon the actuation of the end cycle solenoid switch 262 so that the postpreparation counter assembly 104 now operates in response to impression cylinder rotation to complete the normal programmed postduplicating phase of machine operation.

EXTENDED COUNT OPERATION

It is obvious that the configuration of the cams constituting the cam bank 116 of the postpreparation counter assembly 104 limits the number sheets which may be included in the sheet count occuring during the duplicating phase of machine operation. For example, the postpreparation counter assembly may operate to count 100 copy sheets during the duplicating phase, but would be unable to provide the necessary machine control if a higher sheet count were desired. Therefore, the program control unit 100 has been especially adapted to operate with a high-count auxiliary counter assembly which, for an specified duplicating phase of operation, may temporarily replace the postpreparation counter assembly.

The auxiliary counter assembly, indicated generally at 406, includes a counter reset solenoid 408, a counter 410, a counter-operating solenoid 412, a counter-operated switch 414, a pulse switch 416, and the auxiliary counter solenoid 274. The counter 410 may be any suitable high-count electrical counter which is mechanically actuated and which is capable of operating a counter switch when a predetermined count is reached. One counter of this type is the Kessler-Ellis counter made by the German firm of Fritz Kubler.

The auxiliary counter assembly 406 is removably connected to the programming unit 100 by means of plug-in connecting terminals 318A–318F. The pulse switch 416 of this assembly might be formed by any conventional electrical switch capable of completing a switching circuit each time a copy sheet is fed into the duplicating machine 10. For illustrative purposes, the pulse switch might be formed by a mercury switch attached to a mechanical feeler or other mechanical component within the sheet feed mechanism which is moved each time a copy sheet is fed. This movement will cause the mercury switch to complete a switching circuit.

When the auxiliary counter assembly is employed, the count switch 314 is opened and the postprepartion counter assembly 104 is set to the number one sheet count position. This causes the cam segment 112 to operate the end cycle safety switch 134 so that a circuit is completed to the switch contact 134B and then across the normally closed switch contacts 274E–274F of the auxiliary counter solenoid switch 274 to the pulse switch 416 by way of the plug-in terminal 318G. Each time a copy sheet is fed through the duplicating machine, the pulse switch closes and permits a pulse to pass via the plug-in terminals 318F and 318E to energize the counter solenoid 412. Thus, the counter-operating solenoid is pulsed for each sheet fed through the duplicating machine and the counter 410 is advanced thereby one digit for each such pulse.

When the counter 410 has reached the predetermined sheet count, the counter switch 414 is closed permitting current to flow from the plug-in terminal 318D across the switch 414, the plug-in terminal 318C, to the coil 276 of the auxiliary counter solenoid switch 274. Energization of this solenoid coil results in the establishment of a holding circuit across the closed switch contacts 274B–274A and across the cycle completion switch 126. Also a second circuit is formed across the switch contacts 274D–274C so that current flows to energize the feed-off solenoid 302 and the solenoid coil 260 of the form-off solenoid switch 258. Thus the feeding of copy sheets through the duplicating machine 10 is terminated and the normal postduplicating phase of machine operation is initiated.

When the postduplicating phase is completed and the cycle completion switch 126 is tripped to energize the delay timer motor 316, the holding circuit to the auxiliary counter solenoid switch contact 274A is interrupted and the coil 276 deenergized. Also, when the delay time motor 316 is energized, a circuit is completed to the reset solenoid 40B, and the reset solenoid is energized to cause the counter 410 to reset itself.

It will be readily apparent to those skilled in the art from a consideration of the foregoing specification and drawings, that the present invention provides a novel and improved programming unit capable of effectively programming an offset duplicating machine throughout a complete cycle of operation. Also, this programming unit is adapted to operate effectively with an automatic master feed assembly to automatically complete and reinitiate subsequent cycles of operation as long as a supply of master sheets is fed to the machine.

We claim as our invention:

1. In an offset duplicating machine having at least one rotatable cylinder for receiving a master-printing sheet; a sheet-holding assembly mounted upon said cylinder to selectively grip said master-printing printing sheet; a support for carrying a stack of at least two master-printing sheets and having associated therewith a master-sheet-forwarding assembly for advancing a first master-printing sheet from said stack; a master-loading assembly including sheet-feeding means mounted upon said duplicating machine between said stack support and said rotatable cylinder adapted to receive said first sheet and load the latter into said sheet-holding assembly, a sensor positioned to respond to said master-printing sheet being advanced to said loading assembly; and a programming unit comprising:

a. means responsive to said sensor and operating to disable said master-sheet-forwarding assembly upon said sheet being advanced into said loading assembly;

b. means for actuating said master-loading assembly to load said first master-printing sheet into said holding assembly;

c. means operative with actuation of said master-loading assembly actuating means for actuating said sheet-holding assembly to a position to receive said master and then to a position to hold said master;

d. means for actuating said forwarding assembly subsequent to said master-loading assembly being actuated and effective to advance a second master-printing sheet from said stack into said loading assembly; and e. sheet-sensing means for sensing the presence of a master-printing sheet in said master-loading assembly, said sheet-sensing means operative to disable said master-forwarding and loading assemblies, respectively, upon failure to sense a master-printing printing sheet.

2. In a duplicating machine having at least one rotatable cylinder for receiving a master-printing sheet; a sheet-holding assembly mounted upon said rotatable cylinder to selectively grip said master-printing sheet; a master-forwarding assembly for receiving and forwarding a master-printing sheet to said rotatable cylinder and a motor-driven etch unit having an etch applicator mounted for movement into contact with said master cylinder; a program control unit comprising:

a. sequencing control means operative to count cylinder rotation;

b. sheet-sensing means for sensing the presence of a master-printing sheet in said master-forwarding assembly, said sheet-sensing means operating to prevent machine operation upon failure to sense a master-printing sheet in said master-forwarding assembly;

c. forwarding control means connected to activate said sheet-forwarding assembly to cause forwarding of the master-printing sheet to said cylinder;

d. clamp control means connected to selectively open said sheet-holding assembly and subsequently close said holding assembly; and e. etch control means for moving said etch applicator into contact with said master cylinder, said forwarding control means, clamp control means and etch control means being simultaneously activated by said sequencing control means upon the registration thereof of a predetermined cycle count.

3. The combination of claim 2 wherein said program control unit includes a postpreparation counter having another sensing means responsive to said sheet-sensing means indicating presence of a master-printing sheet to activate air switches adapted to initate air drying of said blanket cylinder to continue during a succeeding cycle of operation of said sequencing control.

4. In a duplicating machine having a rotatable master cylinder for receiving a master-printing sheet from a support for carrying at least two sheets, preduplicating means for operation during a preduplicating phase of the operative cycle of the machine to prepare the machine for a subsequent duplicating phase including a master-printing-sheet-forwarding assembly, a master-printing-sheet-loading assembly and a cylinder carried printing-sheet-holding assembly, duplicating means including a rotatable blanket cylinder for operation during the duplicating phase, said blanket cylinder being adapted to contact said master cylinder to produce an image from said master-printing sheet upon individual copy sheets passing through said machine and postduplicating means for operation during a postduplicating phase to prepare said machine for a subsequent preduplicating phase, a program control unit comprising:

a. sequencing control means responsive to both, cycles of cylinder rotation during said preduplicating phase, and to the number of copy sheets passing through said duplicating machine during the subsequent duplicating phase;

b. preduplicating control means responsive to the cycle count of said sequencing control means to initiate operation of said master-forwarding assembly to advance said master-printing sheet into said master-loading assembly, initiate operation of said master-loading assembly to load said master-printing sheet into said printing-sheet-holding assembly, and operation of the latter to first receive and then hold said master-printing sheet, said preduplicating control means including sheet-count-activating means operated by said sequencing control means at the end of the preduplicating phase to cause said sequencing control means to count the number of copy sheets passing through the duplicating machine;

c. duplicating control means responsive to the sheet count of said sequencing control means to control said duplicating means; and d. a master sheet sensor associated with said preduplicating control means for disabling said preduplicating means of the machine upon failure to sense the presence of a master-printing sheet.

5. The combination of claim 4 wherein said program control unit duplicating control means includes rundown activator means operative in response to a predetermined sheet count by said sequencing control means before the termination of copy sheets being fed through said machine, rundown activator means being operative to cause said duplicating means to terminate contact between said master and blanket cylinders.

6. The combination of claim 4, said program control unit additionally comprising:

d. post-duplicating control means responsive to a cycle count registered by said sequencing control means during the postduplicating phase, said postduplicating control means operating to control the postduplicating means, said duplicating control means operating upon the registration by said sequencing control means of a predetermined sheet count to terminate said duplicating phase and cause the sequencing control means to subsequently register cycles of cylinder rotation.

7. The combination of claim 6, said program control unit additionally comprising:

$e_1$. Sensing means operated by said sequencing control means at the end of said postduplicating phase to sense the presence or absence of a master-printing sheet in said master-loading assembly, said sensing means operating upon sensing a master-printing sheet to cause said sequencing control means to initiate a subsequent preduplicating cycle count.

8. The combination of claim 6 wherein said program control unit sequencing control means includes a preparation counter responsive to cylinder rotation during the preduplicating phase and a postpreparation counter operative to count copy sheets during said duplicating phase, said postpreparation counter being caused to count cycles of cylinder rotation during said postduplicating phase.

9. The combination of claim 8, said program control unit additionally comprising:

$e_2$. a switch operable to selectively deactivate said postpreparation counter during the duplicating phase; and f. an auxiliary counter assembly operable upon deactivation of said postpreparation counter, said auxiliary counter assembly including counter means to register the number of copy sheets passing through said duplicating machine and counter activated control means operable by said counter means at a predetermined sheet count to reactivate said postpreparation counter for operation during the postduplicating phase.